United States Patent
Chang (10) Patent No.: US 10,281,152 B2
(45) Date of Patent: May 7, 2019

(54) THERMAL MECHANICAL DIMPLE ARRAY FOR A COMBUSTOR WALL ASSEMBLY

(71) Applicant: United Technologies Corporation, Farmington, CT (US)

(72) Inventor: Hoyt Y. Chang, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 372 days.

(21) Appl. No.: 15/105,409

(22) PCT Filed: Dec. 19, 2014

(86) PCT No.: PCT/US2014/071601
§ 371 (c)(1),
(2) Date: Jun. 16, 2016

(87) PCT Pub. No.: WO2015/095759
PCT Pub. Date: Jun. 25, 2015

(65) Prior Publication Data
US 2016/0320060 A1    Nov. 3, 2016

Related U.S. Application Data

(60) Provisional application No. 61/918,436, filed on Dec. 19, 2013.

(51) Int. Cl.
  *F02G 3/00* (2006.01)
  *F23R 3/00* (2006.01)
  *F23R 3/50* (2006.01)

(52) U.S. Cl.
  CPC .............. *F23R 3/002* (2013.01); *F23R 3/007* (2013.01); *F23R 3/50* (2013.01); *F23R 2900/00005* (2013.01); *F23R 2900/03041* (2013.01); *F23R 2900/03044* (2013.01); *Y02T 50/675* (2013.01)

(58) Field of Classification Search
  CPC .. F23R 2900/00005; F23R 2900/03041; F23R 2900/03044; F23R 3/002; F23R 3/007; F23R 3/50; Y02T 50/675
  See application file for complete search history.

(56) References Cited

U.S. PATENT DOCUMENTS

| 3,793,827 | A | * | 2/1974 | Ekstedt | F23R 3/08 60/757 |
| 4,109,459 | A | * | 8/1978 | Ekstedt | F23R 3/002 431/352 |
| 4,688,310 | A | | 8/1987 | Kelm et al. | |
| 4,887,663 | A | * | 12/1989 | Auxier | F02K 1/822 165/47 |
| 5,024,058 | A | * | 6/1991 | Shekleton | F23M 5/00 60/752 |

(Continued)

OTHER PUBLICATIONS

EP search report for EP14871314.2 dated Jan. 5, 2017.

*Primary Examiner* — Jesse S Bogue
(74) *Attorney, Agent, or Firm* — O'Shea Getz P.C.

(57) ABSTRACT

A thermal mechanical dimple array for combustor liners of gas turbine engines are located at known hot spots along liner to reduce stress and minimize cracking. Such arrays have indentations in the liners at the hot spots that act to thermal mechanically flex the liner at the hot spot away from the heat source and distribute stresses such that cracking of the liner is reduced and durability is improved.

14 Claims, 7 Drawing Sheets

(56) References Cited

U.S. PATENT DOCUMENTS

| | | | | |
|---|---|---|---|---|
| 5,144,795 | A | * | 9/1992 | Field ................. F02K 1/822 239/127.3 |
| 5,239,818 | A | * | 8/1993 | Stickles ................ F23R 3/04 60/737 |
| 5,528,904 | A | * | 6/1996 | Jones ................. F01D 5/288 60/753 |
| 6,237,344 | B1 | * | 5/2001 | Lee ................... F01D 5/186 165/908 |
| 6,434,926 | B1 | | 8/2002 | Dean et al. |
| 7,789,125 | B2 | * | 9/2010 | Mayer ................. F01D 25/08 165/47 |
| 7,966,823 | B2 | * | 6/2011 | Koshoffer ............ F02K 1/386 60/766 |
| 2002/0108375 | A1 | | 8/2002 | Johnson et al. |
| 2004/0250549 | A1 | * | 12/2004 | Liebe ................. F23R 3/002 60/804 |
| 2005/0056020 | A1 | | 3/2005 | Hadder |
| 2009/0084110 | A1 | | 4/2009 | Dudebout et al. |
| 2010/0205973 | A1 | | 8/2010 | Tschuor et al. |
| 2012/0240584 | A1 | | 9/2012 | Berdou et al. |
| 2013/0025288 | A1 | | 1/2013 | Cunha et al. |

\* cited by examiner

THERMAL MECHANICAL DIMPLE ARRAY FOR A COMBUSTOR WALL ASSEMBLY

This application claims priority to PCT Patent Application No. PCT/US14/071601 filed Dec. 19, 2014 which claims priority to U.S. Patent Application No. 61/918,436 filed Dec. 19, 2013, which are hereby incorporated herein by reference in their entireties.

BACKGROUND

The present disclosure relates to a gas turbine engine and, more particularly, to a thermal mechanical dimple array for a combustor wall assembly.

Gas turbine engines, such as those that power modern commercial and military aircraft, include a fan section to propel the aircraft, compressor section to pressurize a supply of air from the fan section, a combustor section to burn a hydrocarbon fuel in the presence of the pressurized air, and a turbine section to extract energy from the resultant combustion gases and generate thrust.

The combustor section may have an annular wall having inner and outer shells that support respective inner and outer heat shielding liners. The liners may be comprised of a plurality of floating heat shields or panels that together define an annular combustion chamber. An annular cooling plenum is defined between the respective shells and liners for supplying cooling air to an opposite hot side of the panels through a plurality of strategically placed cooling or effusion holes. The effusion holes are generally orientated to create a protective blanket or air film over the hot side of the panels, thereby protecting the panels from the hot combustion gases in the chamber.

Unfortunately, and even with an air film, hot spots are still known to exist at isolated locations on each panel. The hotspots create thermal mechanical stresses that lead to cracking and a shortened panel lifespan. Moreover, increasing the density of cooling holes near or at such hotspots can reduce engine efficiency and/or deprive cooling to other locations in the combustor section or in the engine in general.

SUMMARY

A wall portion of a combustor according to one non-limiting embodiment of the present disclosure includes a liner having a hot side, a predetermined hotspot on the hot side, and a depression defined by the hot side at the hotspot for minimizing thermal mechanical stress.

In a further embodiment of the foregoing embodiment, the wall portion further includes a cold side of the liner disposed opposite the hot side; a thickness of the panel measured between the hot and cold sides; and, wherein the thickness is generally consistent.

In the alternative or additionally thereto, in the foregoing embodiment, the wall portion further includes a shell spaced from the liner for flowing cooling air and the cold side of the liner defining a convex portion opposite the depression, and the shell defining a second depression outward from the convex portion for maintaining a substantially equal distance between the liner and the shell.

In the alternative or additionally thereto, in the foregoing embodiment, the liner has a cold side disposed opposite the hot side and a first indentation defining the depression; and, a shell spaced outward from the cold side and having a second indentation located directly outward from the first indentation for substantially maintaining an equal distance between the liner and the shell.

In the alternative or additionally thereto, in the foregoing embodiment, a dilution passage is in the liner; and the hotspot is disposed downstream of the dilution passage.

In the alternative or additionally thereto, in the foregoing embodiment, a dilution passage is in the liner; and the first indentation is disposed downstream of and adjacent to the dilution passage.

In the alternative or additionally thereto, in the foregoing embodiment, an igniter passage is in the liner; and, the hotspot is proximate to the igniter passage.

In the alternative or additionally thereto, in the foregoing embodiment, the liner has first and second panels joined at a seam; and the hotspot spans across the seam.

In the alternative or additionally thereto, in the foregoing embodiment, the liner is made of a nickel alloy.

A combustor heat shield defines at least in-part a boundary of a combustion chamber of a gas turbine engine according to another non-limiting embodiment includes a structure defining an indentation at a hotspot on the heat shield.

In a further embodiment of the foregoing embodiment, the indentation is constructed and arranged to move outward from the combustion chamber with increasing temperature.

In the alternative or additionally thereto, in the foregoing embodiment, the heat shield defines a dilution passage, and the indentation is located immediately downstream of the dilution passage.

In the alternative or additionally thereto, in the foregoing embodiment, the heat shield is made of a nickel alloy.

In the alternative or additionally thereto, in the foregoing embodiment, the indentation has a substantially consistent wall thickness.

In the alternative or additionally thereto, in the foregoing embodiment, a hot side is at the indentation and the indentation defines a depression communicating with the combustion chamber; and wherein the depression is generally conical in shape.

In the alternative or additionally thereto, in the foregoing embodiment, the indentation has an area substantially equal to an area of the hotspot.

In the alternative or additionally thereto, in the foregoing embodiment, the indentation has an area that is about twice the size of an area of the hotspot.

A method of operating a combustor of a gas turbine engine according to another non-limiting embodiment includes the steps of forming an indentation in a section of a wall of a combustor at a predetermined hotspot location with the section configured to move from an initial position away from a combustion chamber to a second position during heating.

In a further embodiment of the foregoing embodiment, the method includes the additional step of configuring the section to return toward the initial position at least in-part during cooling In a further embodiment of the foregoing embodiment the section achieves the second position during the flow of hot combustion gases through the combustion chamber.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
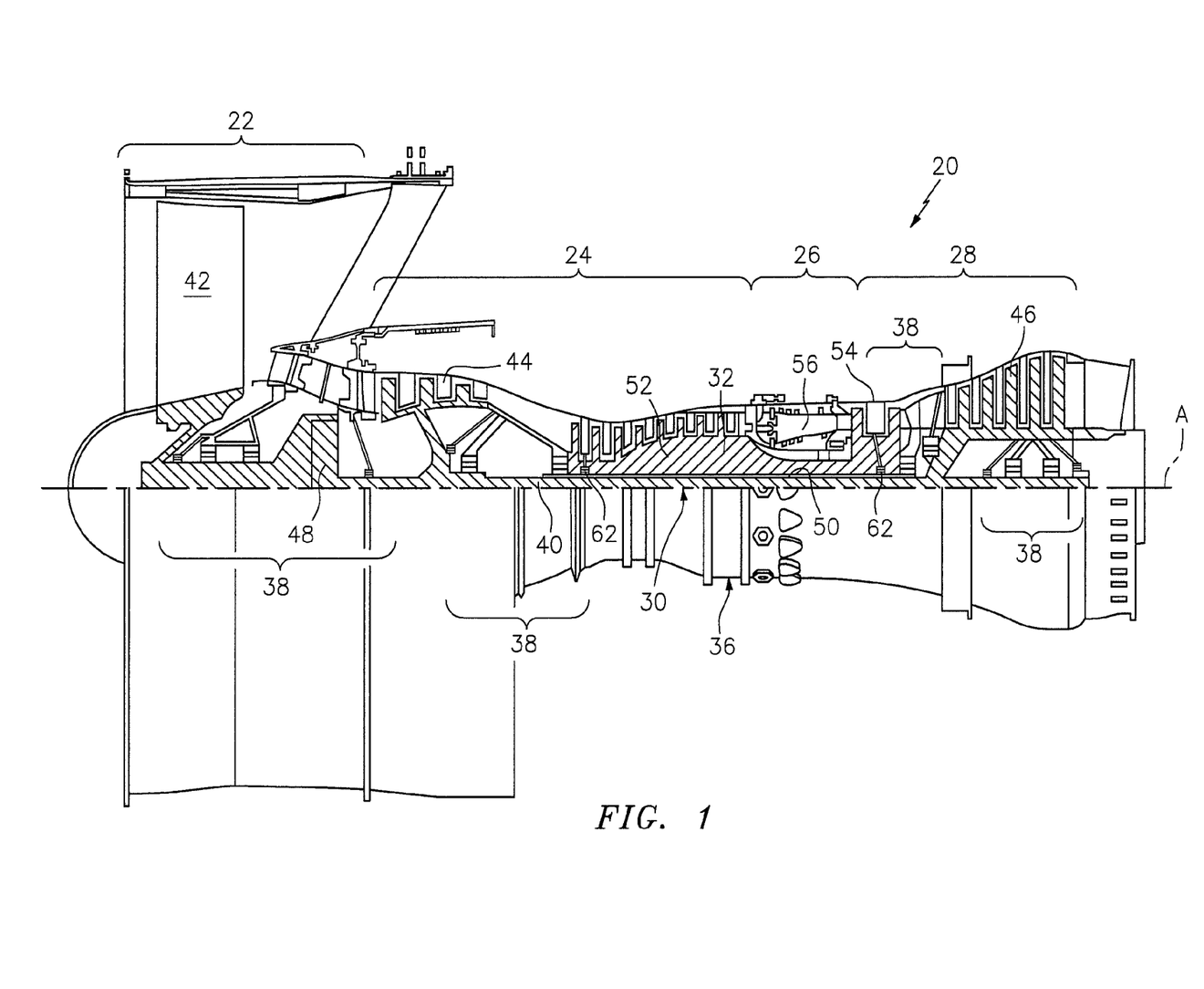
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 or engine case via several bearing structures 38. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") of the compressor section 24 and high pressure turbine 54 ("HPT") of the turbine section 28. A combustor 56 of the combustor section 26 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("T"/$518.7^{0.5}$) in which "T" represents the ambient temperature in degrees Rankine. The Low Corrected Fan Tip Speed according to one non-limiting embodiment of the example gas turbine engine 20 is less than about 1150 fps (351 m/s).

Figure 2:
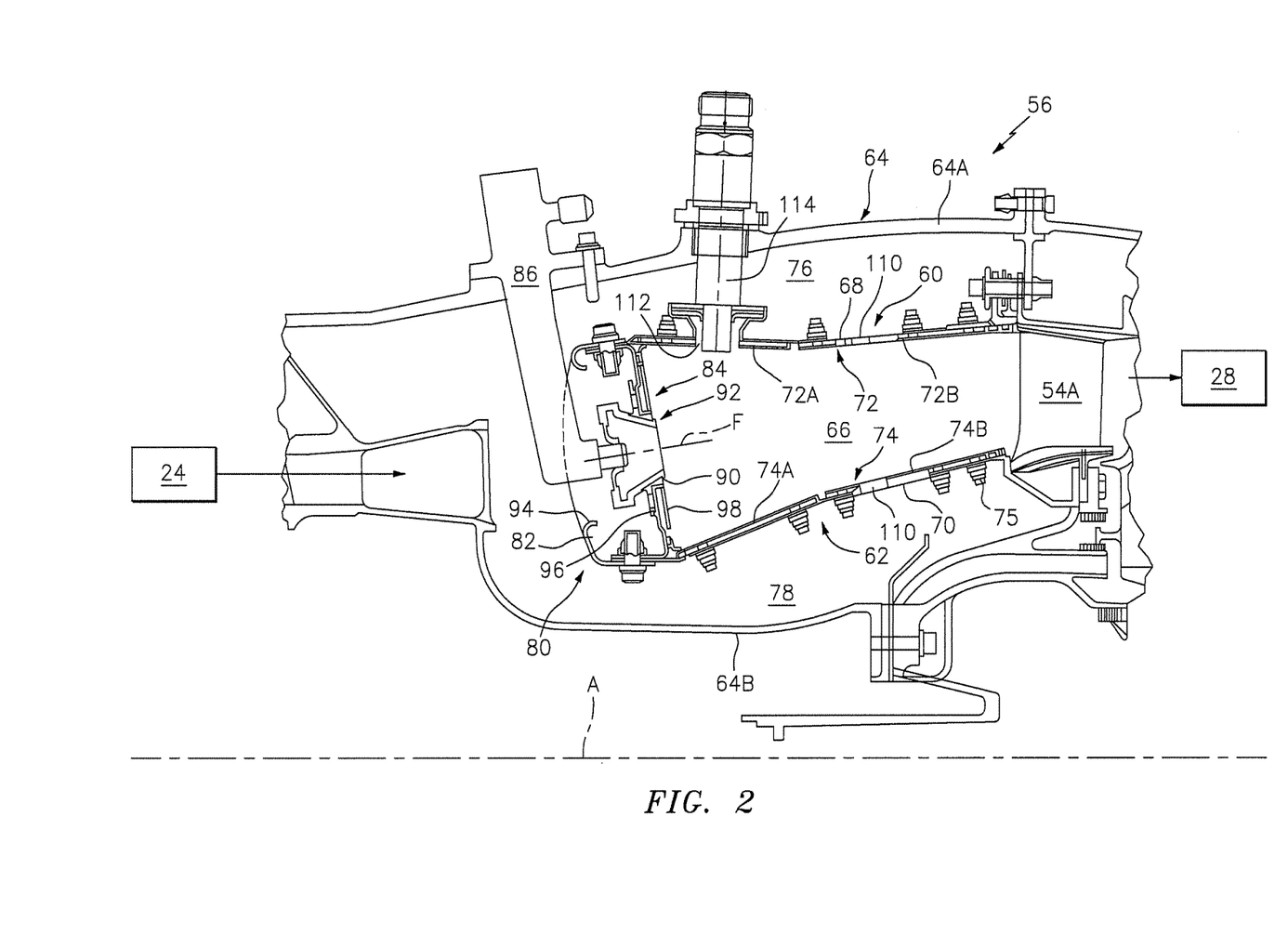
FIG. 2 is a cross-section of a combustor section.

With reference to FIG. 2, the combustor section 26 generally includes a combustor 56 with an outer combustor wall assembly 60, an inner combustor wall assembly 62 and a diffuser case module 64 that encases assemblies 60, 62. The outer combustor wall assembly 60 and the inner combustor wall assembly 62 are radially spaced apart such that an annular combustion chamber 66 is defined therebetween.

The outer combustor wall assembly 60 is spaced radially inward from an outer diffuser case 64A of the diffuser case module 64 to define an outer annular plenum 76. The inner combustor wall assembly 62 is spaced radially outward from an inner diffuser case 64B of the diffuser case module 64 to define an inner annular plenum 78. It should be understood that although a particular combustor is illustrated, other combustor types with various combustor liner arrangements will also benefit. It should be further understood that the disclosed cooling flow paths are but an illustrated embodiment and should not be limited only thereto.

The combustion chamber 66 contains the combustion products that flow axially toward the turbine section 28. Each combustor wall assembly 60, 62 generally includes a respective support shell 68, 70 that supports one or more liners 72, 74 mounted thereto. Each of the liners 72, 74 may be formed of a plurality of floating heat shields or panels that are generally rectilinear and manufactured of, for example, a nickel based super alloy that may be coated with a ceramic, or other temperature resistant material, and are arranged to form a liner array. Each liner may have a multiple of forward panels 72A and a multiple of aft panels 72B that line the outer shell 68. A multiple of forward panels 74A and a multiple of aft panels 74B also line the inner shell 70. It should be appreciated that the liner array may alternatively include but a single panel rather than the illustrated axial forward and axial aft panels.

The combustor 56 further includes a forward assembly 80 immediately downstream of the compressor section 24 to receive compressed airflow therefrom. The forward assembly 80 generally includes an annular hood 82, a bulkhead assembly 84, and a multiple of swirlers 90 (one shown). Each of the swirlers 90 is circumferentially aligned with one of a multiple of fuel nozzles 86 (one shown) and the respective hood ports 94 to project through the bulkhead assembly 84. The bulkhead assembly 84 includes a bulkhead support shell 96 secured to the combustor walls 60, 62, and a multiple of circumferentially distributed bulkhead heat shield or panels 98 secured to the bulkhead support shell 96 around each respective swirler opening 92. The bulkhead support shell 96 is generally annular and the multiple of circumferentially distributed bulkhead panels 98 are segmented, typically one to each fuel nozzle 86 and swirler 90.

The annular hood 82 extends radially between, and is secured to, the forwardmost ends of the combustor wall assemblies 60, 62. Each one of the multiple of circumferentially distributed hood ports 94 receives a respective one of the multiple of fuel nozzles 86 and facilitates the direction of compressed air into the forward end of the combustion chamber 66 through a swirler opening 92. Each fuel nozzle 86 may be secured to the diffuser case module 64 and projects through one of the hood ports 94 into the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted adjacent to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 3:
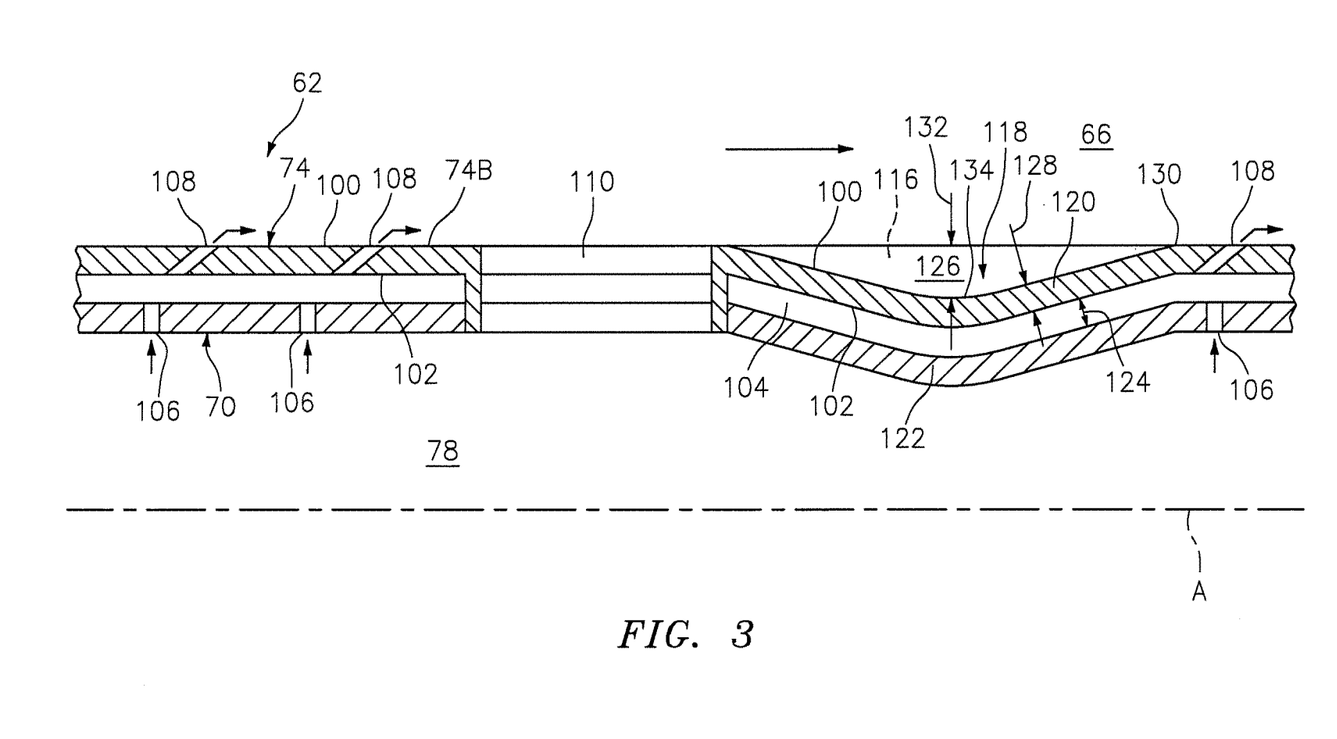
FIG. 3 is a partial cross-section of a combustor wall assembly detailing a thermal mechanical dimple array.

With reference to FIG. 3, the inner liner 74 and inner shell 70 of the inner wall assembly 62 is illustrated to show one non-limiting embodiment of the disclosure; however, it is to be understood that the same teachings may apply to the outer wall assembly 60. A heat shield or panel 74B of liner 74 has a hot side 100 that in-part radially defines a boundary of the annular combustion chamber 66 and an opposite cold side 102. An annular cavity 104 of wall assembly 62 is radially defined between the cold side 102 of liner 74 and the shell 70 for generally receiving cooling air from inner plenum 78 via a plurality of impingement holes 106 in the shell. Air flowing through the impingement holes 106 impinges upon the cold side 102 of liner 74.

Each of the plurality of forward and aft panels 74A, 74B have a plurality of effusion holes 108 for flowing cooling air from the cavity 104 into the combustion chamber 66. The effusion holes 108 are configured to form a thin, cool, blanket or film of air over the hot side 100 of liner 74 thereby in-part protecting the liner from the hot combustion gases. The wall assemblies 60, 62 have a plurality of dilution passages 110 that communicate through both the shells 68, 70 and respective liners 72, 74 for supplying dilution air directly from the respective plenums 76, 78 and into the combustion chamber 66. This dilution air dilutes or quenches the hot combustion gases within the chamber. In addition, the outer wall assembly 60 has at least one igniter passage 112 (see FIG. 2) communicating through the liner 72 and shell 68 for receipt of an igniter 114.

Figure 4:
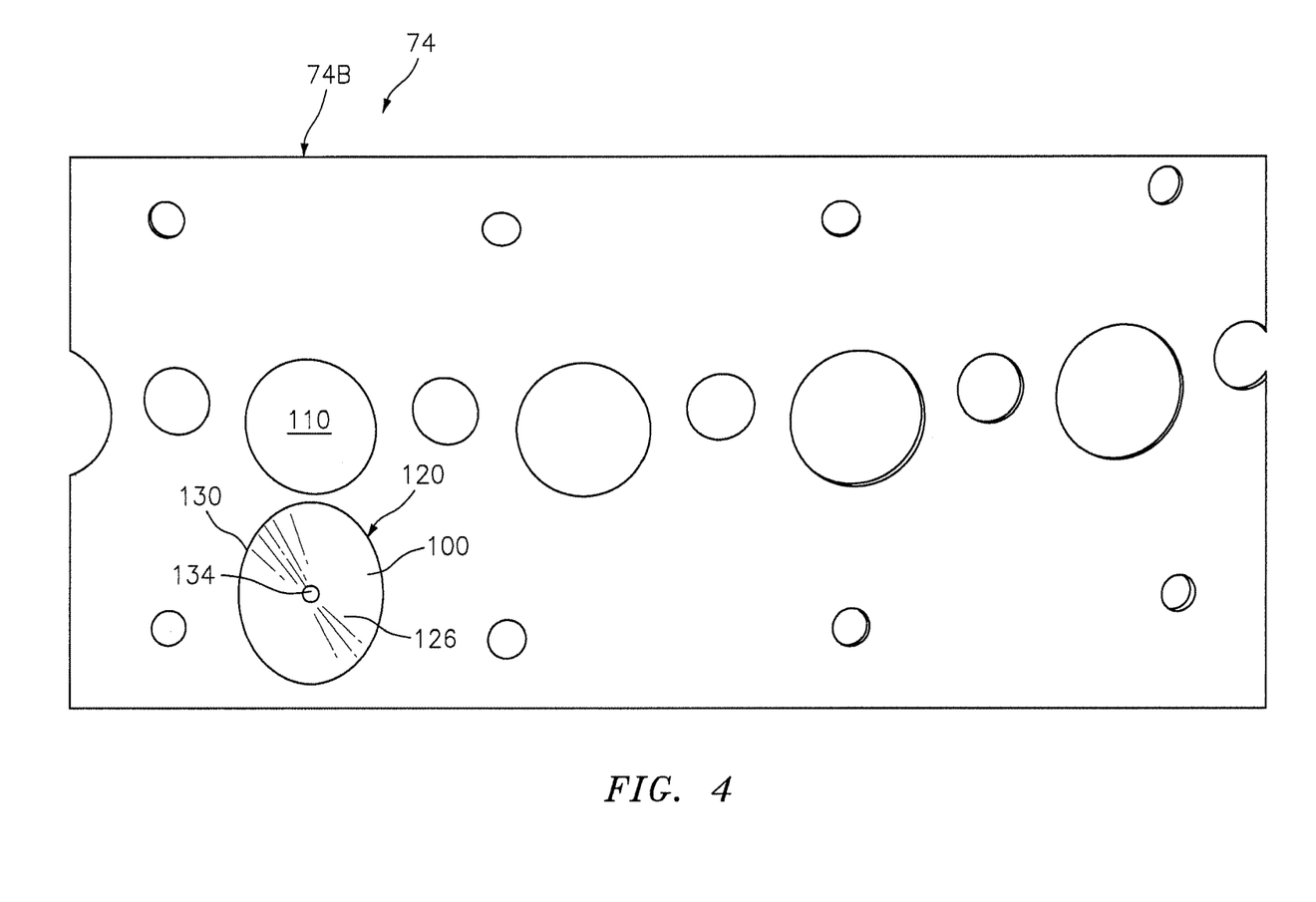
FIG. 4 is a plan view of a hot side of a panel of the wall assembly.
Figure 5:
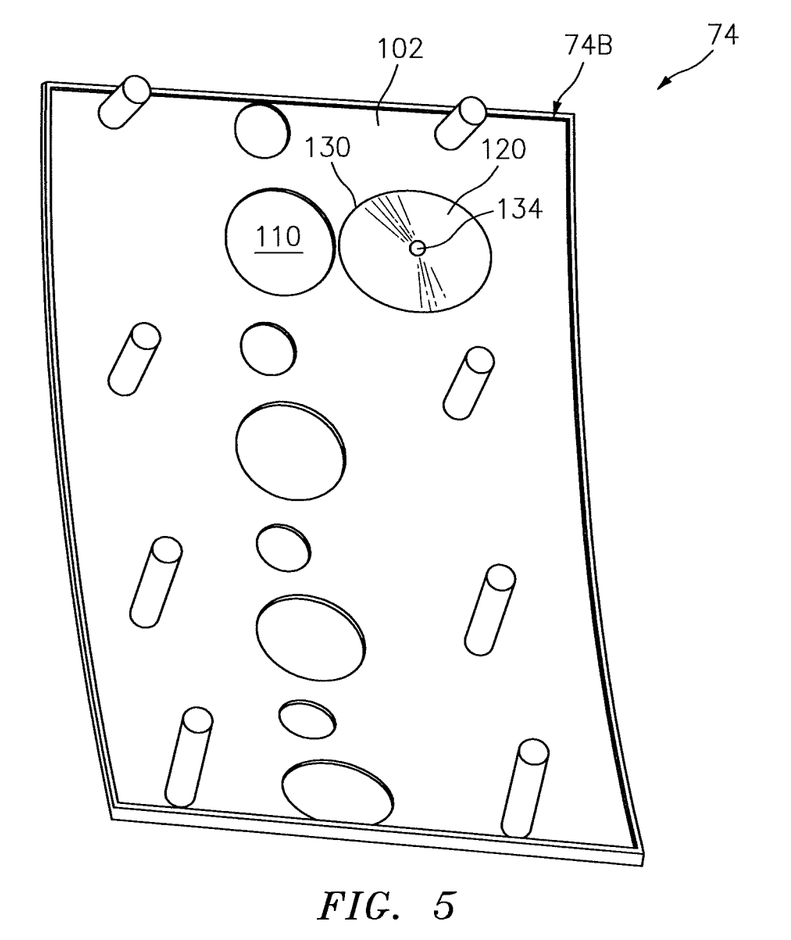
FIG. 5 is a perspective view of a cold side of the panel.

Referring to FIGS. 3 through 5, the effusion holes 108 are distributed across the hot side 100 of liner 74 to reduce any temperature gradients across the hot side and thereby prolong the useful lifespan. Unfortunately, hot spots 116 may exist at selected locations on traditional hot sides that may be generally cylindrical requiring additional effusion holes 108. Such hotspots may exist, for example, immediately downstream of the dilution passages 110, about the igniter passages 112 or at seams between panels of the liners 72, 74. Dense grouping of effusion holes at hot spot locations can deprive cooling to other portions of the liner, bulkhead, or other engine components. To reduce such dense effusion hole groupings, wall portions or thermal mechanical dimple arrays 118 are strategically located in the liners 72, 74 and may be located in the respective shells 68, 70 generally at the hot spot 116 locations. It is further understood that the panels described are not limited to the generally cylindrical liners 72, 74 but may also apply to other areas of the combustor such as the heat shields or panels of the bulkhead assembly 84.

For dilution holes 110, the potential hot spot 116 location, and likewise the dimple array 118 is immediately downstream of the dilution hole 110. Each dimple array 118 has a first indentation 120 in, for example, the liner 74, and a second indentation 122 in the shell 70. The first and second indented structures or indentations 120, 122 are arcuately aligned with one-another and with respect to axis A in order to maintain a consistent gap or distance 124 of the cavity 104 so as not to interrupt or obstruct cavity cooling flow. A depression 126 of the first indentation 120 is defined by the hot side 100 and thus is in direct communication with the combustion chamber 66. At the first indentation 120, the hot side 100 is generally concave and the opposite cold side 102 is convex such that a thickness 128 of the liner 74 is generally maintained across the span of the indentation 120 along axis A. The indentation 120 may thus be generally semi-spherical in shape. However, other non-limiting embodiments include an indentation that is conical in shape or oblong in shape. It is understood that the shape of the indentation may be dictated by the shape of the hotspot and temperature distribution thereof. Generally, the hotter the temperature at any chosen location in the hot spot, the deeper may be the depression at that chosen location.

The depression 126 is defined within a section or perimeter 130 of the panel 74 that generally encompasses the hotspot 116 and generally any shifting of the hotspot during engine operation. From the surrounding perimeter 130, the depression increases in depth to a maximum depth 132 located at about a center 134 of the depression 126. The magnitude and thus rate of increase in depth from the perimeter 130 and to the center 134 is generally dictated by the temperature gradient of the hotspot 116.

Figure 6:
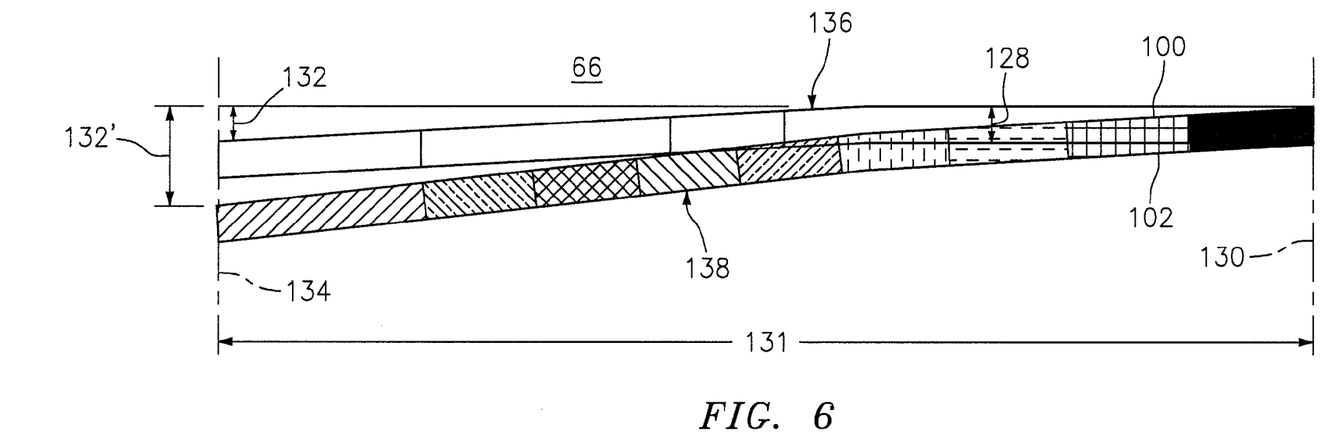
FIG. 6 is a partial cross-section of the panel in a hot condition.
Figure 7:
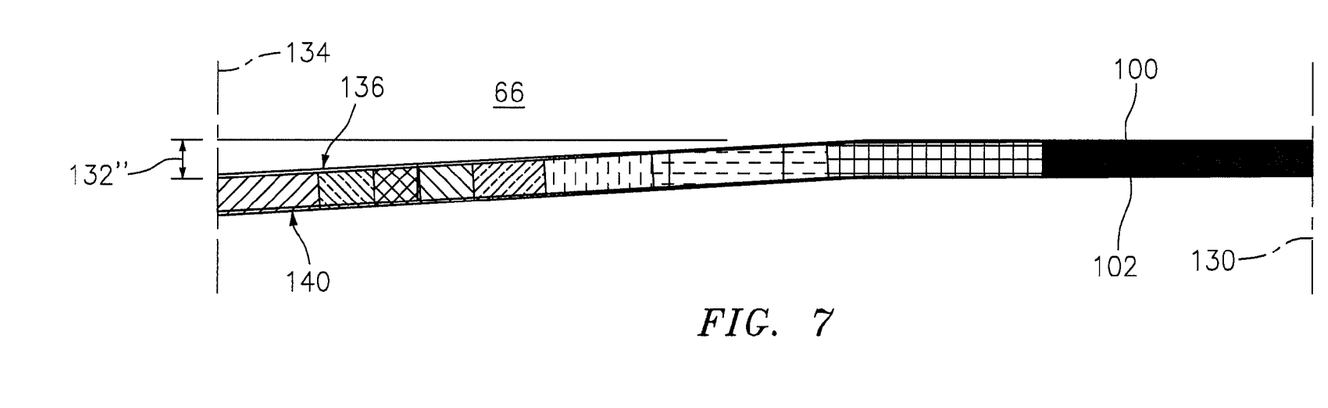
FIG. 7 is a partial cross-section of the panel in a cold condition.
Figure 8:
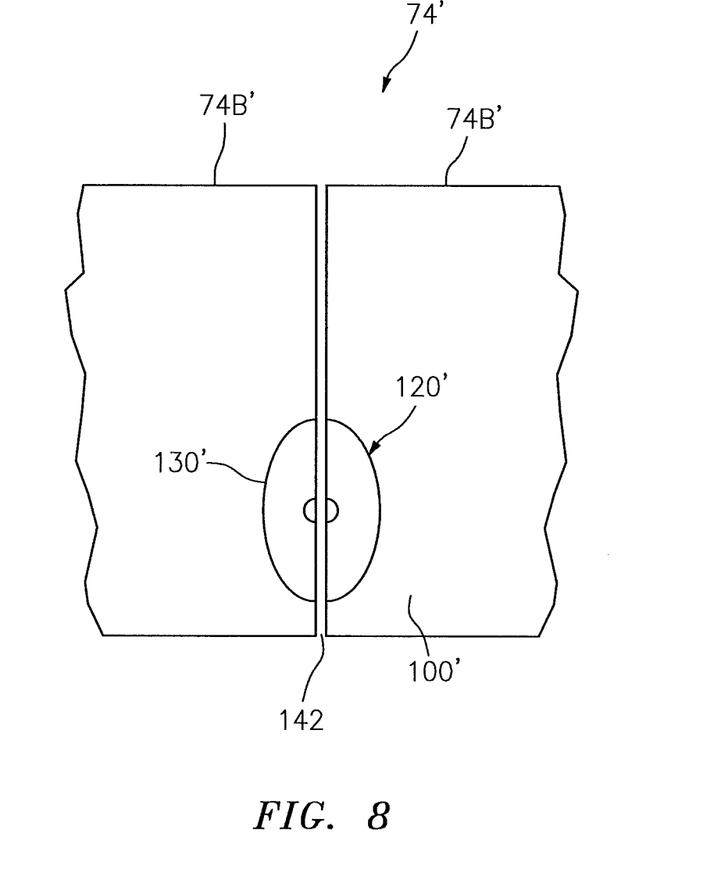
FIG. 8 is a plan view of a second non-limiting embodiment of a thermal mechanical dimple array.

Referring to FIGS. 6 through 8, a specimen example of the indentation 120 is illustrated. In this specimen example, the liner 74 is made of a nickel alloy, PWA 1455, having a thickness 128 of about 0.050 inches (1.27 mm) and a specimen length 131 (for illustrative purposes) of about 1.5 inches (38.10 mm). In this specimen, without the assistance of effusion holes, and during operation, the temperature distribution is about 1032 degrees Fahrenheit (555.6 Celsius) at the perimeter 130 and increases to about 2080 degrees Fahrenheit (1137.8 Celsius) at the center 134. The liner 74 has an initial state 136, an operational or hot state 138 and a cold state 140. In the initial state 136, the depression maximum depth 132 is about 0.05 inches (1.27 mm). In the hot state 138, the indentation 120 buckles or flexes away from the heat source or chamber 66 and to a maximum depth 132' of about 0.136 inches (3.454 mm); and, as the specimen cools, the indentation 120 returns to a residual maximum depth 132" of about 0.057 inches (1.448 mm).

When in the initial state 136, no appreciable stress exists in the center 134 of the indentation 120. However, when in the hot state 138, in-plane stress generally at the center 134 is increased on the cold side 102 to about 38.986 kpsi (268.8 MPa) and decreased on the hot side 100 to about −44.041 kpsi (−303.7 MPa). When in the cold state 140, in-plane stress is decreased on the cold side 102 to about −79.028 kpsi (−544.9 MPa); and, increased on the hot side 100 to about 117.11 kpsi (807.4 MPa). The direction of buckling during operation (i.e. away from the heat source) and the in-plane distribution of stress between the hot and cold sides 100, 102 are inherently beneficial toward reducing liner stress, eliminating or minimizing cracking and thereby promoting component durability. That is, when in operation, the indentation 120 moves away from the heat source thereby minimizing the aggravating factors of heat and the in-plane stress is compressive in nature thereby minimizing cracking at the hot side 100. In contrast, the more traditional, generally planar, liners or heat shields will buckle toward the heat source or into the combustion chamber thus further aggravating the thermal mechanical stresses.

Referring to FIG. 8, an alternative and non-limiting embodiment of a thermal mechanical dimple array is illustrated wherein like elements to the first embodiment have like identifying numbers except with the addition of a prime symbol. In this second non-limiting embodiment, a thermal mechanical dimple array 120' is located at a hot spot along a liner panel seam 142 formed between two adjacent panels 74B' of a liner 74'.

It is understood that relative positional terms such as "forward," "aft," "upper," "lower," "above," "below," and the like are with reference to the normal operational attitude and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A wall portion of a combustor comprising:
    a liner having a hot side, a hotspot on the hot side, and a first depression defined by the hot side at the hotspot for minimizing thermal mechanical stress; and
    a shell spaced from the liner for flowing cooling air;
    wherein the liner has a cold side disposed opposite the hot side and a thickness between the hot and cold sides, the thickness being consistent across the first depression; and
    wherein the cold side of the liner defines a convex portion opposite the first depression, and the shell defines a second depression outward from the convex portion for maintaining an equal distance between the liner and the shell.

2. The wall portion set forth in claim 1,
    wherein the shell has a second indentation defining the second depression; and
    wherein the liner has a first indentation defining the first depression and located directly inward from the second indentation for maintaining the equal distance between the liner and the shell.

3. The wall portion set forth in claim 1 wherein the liner defines a dilution passage and the hotspot is disposed axially downstream of the dilution passage.

4. The wall portion set forth in claim 2 wherein the liner defines a dilution passage and the first indentation is disposed axially downstream of and adjacent to the dilution passage.

5. The wall portion set forth in claim 1 wherein the liner defines an igniter passage and the hotspot is adjacent the igniter passage.

6. The wall portion set forth in claim 1 wherein the liner has first and second panels joined at a seam and the hotspot spans across the seam.

7. The wall portion set forth in claim 4 wherein the liner is made of a nickel alloy.

8. The wall portion set forth in claim 2, wherein the first and second indentations are configured to move outward from the combustion chamber with increasing temperature.

9. The wall portion set forth in claim 1 wherein at least one of the first and second depressions is semi-spherical in shape.

10. The wall portion set forth in claim 1 wherein the first depression has an area equal to an area of the hotspot.

11. The wall portion set forth in claim 1 wherein the first depression has an area that is greater than the area of the hotspot.

12. A method of operating a combustor of a gas turbine engine comprising the step of:
    forming a first indentation in a section of a liner of a combustor at a hotspot location with the section configured to move from an initial position and away from a combustion chamber to a second position during heating; and forming a second indentation in a shell of the combustor;

wherein the liner has a cold side disposed opposite the hot side and a thickness between the hot and cold sides, and the thickness is consistent across the first indentation; and wherein the cold side of the liner defines a convex portion opposite the first indentation and the second indentation is disposed outward from the convex portion for maintaining an equal distance between the liner and the shell.

13. The method according to claim 12, further comprising a step of:

configuring the section to return at least in-part toward the initial position during cooling.

14. The method according to claim 12, wherein the section achieves the second position during the flow of hot combustion gases through the combustion chamber.

* * * * *